March 24, 1925.

W. W. DAVIS

GREASE CUP

Filed Jan. 2, 1923

1,531,234

INVENTOR.
William W. Davis
BY *Dewey, Strong,*
*Townsend and Loftus*
ATTORNEYS.

Patented Mar. 24, 1925.

1,531,234

UNITED STATES PATENT OFFICE.

WILLIAM W. DAVIS, OF SAN FRANCISCO, CALIFORNIA.

GREASE CUP.

Application filed January 2, 1923. Serial No. 610,184.

*To all whom it may concern:*

Be it known that I, WILLIAM W. DAVIS, a citizen of the United States residing in the city and county of San Francisco and State of California, have invented new and useful Improvements in a Grease Cup, of which the following is a specification.

This invention relates to a grease cup and especially to a novel form of plunger therefor.

The object of the present invention is to generally improve and simplify devices of the character described and particularly the plunger structure employed; to provide a structure embodying a thin, resilient, annular, metallic packing member; to provide a rotatable connection between the packing member and a plunger head without perforating the packing member, and further to provide a plunger head and packing member assembly which will consume a minimum of vertical space within the grease cup and to which a retractory or advance movement may be readily transmitted. Further objects will hereinafter appear.

One form which my invention may assume is exemplified in the following description and illustrated in the accompanying drawings, in which—

Figure 1:
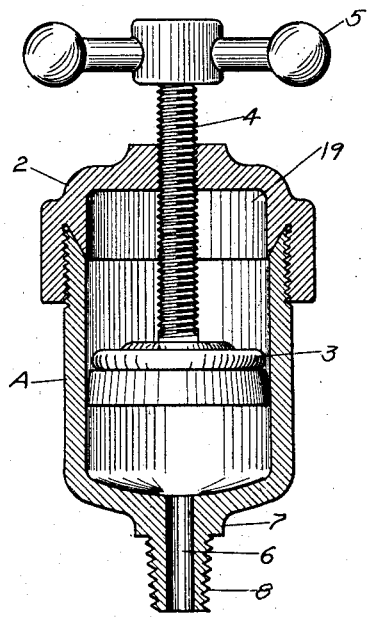
Fig. 1 is a central, vertical, longitudinal section through a grease cup showing the application of the invention.
Figure 3:
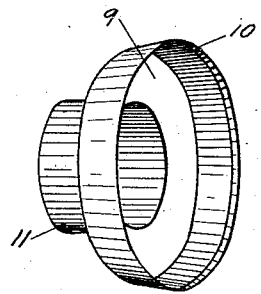
Fig. 3 is a perspective view of the packing member.
Figure 2:
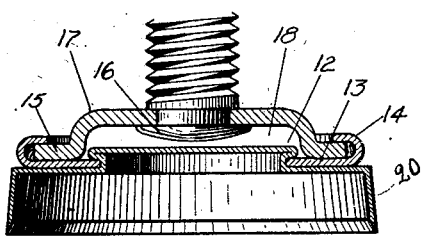
Fig. 2 is an enlarged detail sectional view of the plunger and the packing member.

Referring to the drawings in detail, and particularly to Figs. 1 and 2, A indicates a standard form of grease cup provided with a cover 2, a plunger 3, a screw rod 4 by which reciprocal movement is transmitted to the plunger, and a handle 5 to impart a turning movement to the screw rod. The grease cup is otherwise provided with a discharge duct 6 at its lower end which extends through a nut like extension 7 and a threaded nipple 8 by which connection is made with a bearing or other part to be lubricated. The plunger and the packing member form the subject matter of the present application and are particularly illustrated in Figs. 2 and 3.

The packing member proper consists of a thin metallic disk 9, which is provided with an annular resilient downwardly projecting flange 10. This flange is slightly tapered and is larger in diameter at its lower end than at its upper end to permit contraction of the flange when inserted in the grease cup. The center portion of the packing member of the disk 9 is raised, as at 11, and this raised portion is later flattened out as shown at 12 to form a clinched and permanent connection between the packing member and a comparatively heavy metallic disk indicated at 13. This disk is flanged and turned over as indicated at 14 along its outer edge and forms a swivel connection with a metallic plate or plunger head 15 which in turn is clinched or otherwise secured to the lower end of the screw rod as indicated at 16. The center portion of the head 15 is bulged or raised as indicated at 17 to form a center chamber or space 18, which chamber provides ample space for the clinched portion 12 of the member 11 and the clinched end 17 of the rod 4. In other words binding action between the clinched end 16 of the rod 4 and the clinched upper end of the member 11 must be avoided as free turning movement of head 15 with relation to the disk 13 and the annular overturned flange 14 is desired. The disk 13 and head 15 are rotatable with relation to each other and as such prevent rotation of the packing member when it is being advanced or retracted by means of the screw rod 4.

The several parts of the plunger as a whole are cheaply manufactured and readily assembled as they may be punched out and shaped by ordinary dies in a punch press. It can further be seen that the vertical heighth or space assumed by a plunger constructed and assembled as here shown is exceedingly small, thus materially increasing the grease carrying capacity of the cup. It should further be noted that the cap 2 is provided with a recess or chamber 19 and that the plunger when withdrawn enters this chamber and as such are removed with the cap during the filling of the cup. In other words, it is possible to completely fill the cup and then to apply the cap as the plunger is retained within the cup in a position above the upper edge of the cup. It may then be advanced by turning the handle 5 and when so advanced is transferred from the chamber 19 in the cap to the inner chamber of the grease cup where it immediately engages the grease in such a manner as to exert pressure which will force the grease through the discharge duct 6.

It was previously stated in this specification that the annular flange 10 of the packing member is subjected to a slight contracting and expanding action due to the taper employed. This is of considerable importance as the annular flange 10 is considerably contracted or compressed when transferred from the chamber 19 of the cap to the chamber of the grease cup; this compression being sufficient to prevent any by-passing or leakage of grease when pressure is exerted on the plunger.

In actual practice the packing member is constructed of exceedingly thin shim metal, which metal seldom exceeds 3/1000 of an inch in thickness. Shim steel or any suitable metal may be employed, but preferably shim brass, as this seems to be more resilient in action and seats itself more readily than other metals experimented with.

To permit free transfer of the packing member from the chamber 19 to the grease cup proper, and further, to prevent accidental nicking or marring of the thin lower annular edge of the packing member, it is advisable to taper the upper end of the grease cup as shown at 20. Thus, if the chamber 19 is slightly larger than the interior diameter or bore of the grease cup, no detrimental effect is encountered, as the annular flange 10 is gradually compressed during the transfer from the chamber 19 to the grease cup proper when it engages the tapering upper end of the cup indicated at 20.

Shim metal, not exceeding 3/1000 of an inch in thickness, is exceedingly thin and a knife like edge is thus produced at the point indicated at 21. It is for this reason that care must be taken to protect this knife like edge. Such protection is obtained by transferring the plunger and the packing member to the chamber 19 during removal of the cap, and further protection and insurance against damage is obtained by tapering the upper end of the cup as indicated at 20.

One of the main features of the present invention is the provision of a metallic packing member constructed as here shown, which is not perforated; that is, a connection is formed between the packing member 9 and the plate 13 by clinching projection 11. It can, therefore, be readily seen that leakage can not take place due to the connection formed between the head plate 15 and the packing member, and that the only leakage which could possibly be encountered would be leakage exterior of the flange 10. This is, however, practically prevented by the snug engagement of said flange with the interior surface of the cup, and it is further prevented by maintaining said flange under slight compression.

Actual experience has proven that exceedingly high pressures can be applied with a packing member of this character without the least transfer or leakage of grease. This is also true where a lubricating oil is employed and forced into a bearing by a packing member of this character.

Another important feature of the present invention is the provision of a joint between the head and the packing member. This joint permits the rod 4 and the head member 15 to turn freely when the plunger is advanced, and turning movement of the packing member is thus eliminated. This considerably reduces wear, and it furthermore permits the annular flange 10 to readily seat or conform itself to any slight irregularity that might be encountered on the interior surface of the cup.

While certain features of the present invention are more or less specifically illustrated, I wish it understood that various changes in form and proportion may be resorted to within the scope of the appended claims, similarly that the materials and finish of the several parts employed may be such as the experience and judgment of the manufacturer may dictate or various uses may demand.

Having thus described my invention, what I claim and desire to secure by Letters Patent is—

1. In a device of the character described, a cylinder, a screw-threaded rod carried thereby, a plunger on the end of the rod, said plunger comprising a disk-like head member fixed to the end of the rod, a thin metallic imperforated cup-shaped packing member carried by said head, and means forming a rotatable connection between the periphery of said head member and the packing member.

2. A plunger of the character described, comprising a head member, a thin metallic disk carried thereby, a resilient annular flange formed on the periphery of the disk, said flange having a knife-like annular edge, a central extension formed as an integral part of the metallic disk, a second disk surrounding the same and connected with the metallic disk by clinching the central extension on the metallic disk with relation to the second disk, and a connection formed between the second disk and the head member which permits a relative turning movement of the head member with relation to the metallic disk and the second named disk.

3. A plunger of the character described, comprising a thin metallic disk, an annular resilient flange formed on the periphery of the disk, said flange presenting a knife-like edge, a central extension formed as an integral part of the disk, a second disk surrounding the same and connected with the metallic disk by clinching the central extension with relation to the second disk, a disk-like head member, an annular flange on the second disk adapted to be turned over to form a rotatable connection between the second named disk and the disk-like head member, and a screw rod rigidly secured to the center portion of the disk-like head member.

4. In a device of the character described, a plunger comprising a head member, a packing member therefor, said packing member comprising a thin flexible disk, a resilient annular flange formed on the disk, a rotatable connection formed between the disk and the head member, a grease cup adapted to receive the head and the packing member, a cover for said grease cup, said cover having a chamber formed therein adapted to receive the head and the packing member, and a screw rod rigidly connected to the head member and having a threaded connection with the cover.

WILLIAM W. DAVIS.